US012415650B2

(12) United States Patent
Phung

(10) Patent No.: US 12,415,650 B2
(45) Date of Patent: Sep. 16, 2025

(54) FOLDED LAMINATE BLANK AND A PACK FORMED THEREFROM

(71) Applicant: PROAMPAC HOLDINGS INC., Cincinnati, OH (US)

(72) Inventor: Quang Phung, London (GB)

(73) Assignee: ProAmpac Holdings Inc., Cincinnati, OH (US)

( * ) Notice: Subject to any disclaimer, the term of this patent is extended or adjusted under 35 U.S.C. 154(b) by 0 days.

(21) Appl. No.: 18/098,274

(22) Filed: Jan. 18, 2023

(65) Prior Publication Data

US 2023/0150716 A1 May 18, 2023

Related U.S. Application Data

(63) Continuation of application No. PCT/GB2021/051812, filed on Jul. 14, 2021.

(30) Foreign Application Priority Data

Jul. 23, 2020 (GB) ..................................... 2011423

(51) Int. Cl.
*B65D 5/36* (2006.01)
*B31B 50/26* (2017.01)
(Continued)

(52) U.S. Cl.
CPC ............ *B65D 5/3685* (2013.01); *B31B 50/26* (2017.08); *B31B 50/64* (2017.08); *B65D 5/4204* (2013.01);
(Continued)

(58) Field of Classification Search
CPC .. B65D 5/3685; B65D 5/4204; B65D 5/4266; B65D 5/4279; B65D 5/563; B65D 5/56;
(Continued)

(56) References Cited

U.S. PATENT DOCUMENTS 3,964,669 A * 6/1976 Sontag .................. B65D 75/28 229/87.08
5,165,568 A * 11/1992 Wischusen, III ........ B65D 5/62 229/87.01

(Continued)

FOREIGN PATENT DOCUMENTS

| | | | |
|---|---|---|---|
| DE | 3612032 | A1 | 10/1987 |
| GB | 2599067 | A | 3/2022 |
| WO | 2022018409 | A1 | 1/2022 |

OTHER PUBLICATIONS

English machine translation of German Patent Application No. DE3612032 published Oct. 15, 1987.

(Continued)

*Primary Examiner* — Christopher R Demeree
(74) *Attorney, Agent, or Firm* — McLane Middleton, Professional Association

(57) ABSTRACT

A blank which can be folded to form a pack for food items and the like. The blank being formed of a laminate of a card layer on a film layer. The blank has a front face (9) and rear face (13) connected to opposite sides of a base (10) via fold lines (12, 14). The base has a central third transverse fold line (11) about which the base can be folded in an opposite sense. Side panels (15, 17) extend transversely from both sides of the blank. A film layer extends beyond the card layer so as to form unsupported film regions with a first region extending transversely from the base (10) and a second region continuous with the first region to at least partially overlie a corresponding side panel (15, 17) when the blank is folded. The second regions of unsupported film bond with the film on the corresponding side panel to seal the side panels in the erected pack.

18 Claims, 6 Drawing Sheets

(51) Int. Cl.

| | |
|---|---|
| ***B31B 50/64*** | (2017.01) |
| ***B31B 100/00*** | (2017.01) |
| ***B31B 120/30*** | (2017.01) |
| ***B65D 5/42*** | (2006.01) |
| ***B65D 5/56*** | (2006.01) |

(52) U.S. Cl.

CPC ......... *B65D 5/4266* (2013.01); *B65D 5/4279* (2013.01); *B65D 5/563* (2013.01); *B31B 2100/0026* (2017.08); *B31B 2120/302* (2017.08)

(58) Field of Classification Search

CPC ... B65D 5/18; B65D 5/36; B65D 5/42; B65D 5/2028; B65D 5/0227; B65D 5/548; B65D 5/62; B65D 75/28; B65D 77/003; B32B 2317/12; B32B 2323/10; B32B 2439/70; B32B 27/10

USPC ........ 229/117.01, 164.1, 116, 162.1, 125.26, 229/125.31, 182, 5.81; 206/776

See application file for complete search history.

(56) References Cited

U.S. PATENT DOCUMENTS

| | | | | |
|---|---|---|---|---|
| 6,431,365 | B1 * | 8/2002 | Money ................. | B65D 5/4204 229/115 |
| 2010/0019020 | A1 * | 1/2010 | Phung .................. | B65D 5/4204 229/162.1 |
| 2010/0127054 | A1 * | 5/2010 | Goldman ............. | B65D 5/3607 229/116 |
| 2013/0026215 | A1 * | 1/2013 | Lenhard ................... | B65D 5/18 229/126 |
| 2015/0060535 | A1 * | 3/2015 | Moore ...................... | B65B 7/26 493/162 |
| 2023/0150715 | A1 | 5/2023 | Phung et al. | |

OTHER PUBLICATIONS

International Search Report and Written Opinion dated Nov. 2, 2021, received in PCT/GB2021/051812.

* cited by examiner

FOLDED LAMINATE BLANK AND A PACK FORMED THEREFROM

CROSS-REFERENCE TO RELATED APPLICATIONS

This application is a continuation of currently pending international application no. PCT/(GiB2021/051812 having an international filing date of Jul. 14, 2021 and designating the United States, the international application claiming the right of priority based upon prior filed United Kingdom application no. GB2011423.7, filed Jul. 23, 2020. The entire contents of the aforesaid international application and the aforesaid United Kingdom application are incorporated herein by reference in their entireties.

BACKGROUND

The present invention relates to a pack formed from a folded laminate blank.

It is particularly aimed a pack which can hold a food item such as a tortilla or wrap. Such containers generally have a rectangular base with four upstanding sidewalls and are designed to hold a food item such as a wrap or tortilla. The wrap is made and then cut in half on a diagonal and the two halves are then placed in the pack such that the diagonal cut faces are displayed uppermost. The top of the container is usually angled at the cut surfaces of the wrap. A lid encloses the top of the pack. A film is adhered across the upper part of the sidewalls to provide a window to show the contents of the pack.

A typical prior art pack is shown in FIG. 1. This comprises a front face 1, a pair of side faces 2 on either side, and a back face 3 connected to one of the side panels 2 by a number of fold lines. A tab 4 is provided at the opposite edge of the back face 3. Adhesive is applied to the tab 4 depicted by the shading in FIG. 1 such that the blank can be folded about the fold lines between the, side and back faces and adhered to form a rectangular configuration. The upper half of the blank (above line 5) is laminated with a plastic film to allow the formation of a window 6 in the top part of the container to provide visibility of the contents.

The base of the container is made of a number of base panels 7 and tabs 8 to which adhesive is applied. When the blank is folded together as described above the base panels interlock in order to form the base and are bonded together with the tabs 8, which adhere to an adjacent base panel.

The pack suffers from a number of disadvantages. In order to form the pack from the blank, numerous folds are necessary to fold the front, side and back panels together. It is necessary to apply adhesive to the tabs 8 and then fold the four base panels together while the pack is supported by a rectangular support in order to create and bond the base.

The use of the multi part base provides multiple leak paths into the container such that a closed pack is highly porous to air. As such, a pack of this type can typical only be used to store a food item for one or two days.

The present invention aims to provide a pack which is easier to produce and can increase the longevity of the container.

DE3612032 discloses an open box for holding powdery or granular goods. It uses a patch of film which covers the base of the blank and is then folded up with the base to provide a dust tight lining for the base in the finished box. The side walls are made up by side panels on opposite sides of the blank. One of these side wall panels has an adhesive tab which is mostly without film which is adhered to the opposite side panel to form a side wall in the finished container. In a less preferred example, the film extends along the side wall panels, but the side walls are still sealed by the adhesive panels. It is not designed as a food pack and does not have a lid. It therefore does not address the above problems.

SUMMARY

According to the present invention there is provided a pack according to claim 1.

The present invention also extends to a pack formed from the blank according to claim 2.

Rather than forming a base from a number of separate panels, the present invention has a base which is connected to the front face and rear face and from which the unsupported film region extends. There is therefore a continuous film surface provided by the laminate extending across the rear face, front face, and base and beyond the base.

The fold lines on the base allow the base to be folded up such that the unsupported film forms sealed side seams for the pack thereby creating a receptacle with no leakage paths at any corners or seams.

As compared to DE3612032, the use of two bonded film layers to seal the side panels in the erected pack prevents leakage paths in the side panels.

Such a pack is much easier to form to the prior art as it requires only that three folds are made about the first to third fold lines and a single bonding step is then required which can take place with the folded blank in a flat configuration thereby simplifying the process. Preferably, the film is a heat sealable film such that the bonding of the sides of the container can be done by the application of heat. Alternatively, it may be an adhesive connection.

The side panels may be formed exclusively of film. However, preferably, each side panel is at least partially formed of the laminate.

Each of the side panels may be formed as a single laminated panel extending transversely from a lateral edge of a front face or a rear face. In this case, the single side panel preferably has a transverse dimension responding to the longitudinal dimension of the base. If the transverse dimension of the side panel is slightly larger than the longitudinal dimension of the base, this will allow the side panel to be supported against an edge of the other of the front face and rear face to prevent the sides of the container from collapsing inwardly.

However, preferably, at least one of the side panels is formed of two laminated side panels sections, one extending transversely from a lateral edge of the front face and the other extending transversely from a lateral edge of the rear face, one of the panels being narrower than the other in the transverse direction such that the second unsupported film region extends from the longitudinal edge of the narrower panel. With such an arrangement, the side panel sections be can narrower than the alternative of producing the side panel as a single section. This provides a narrower blank and therefore results in less material wastage.

In this case, preferably, the side panel sections of a side panel overlap one another in the erected configuration. This provides greater rigidity to the pack as it supports the side walls against over rotating inwardly.

The pack may be used in an open configuration if it is used for food items which are consumed fairly soon after purchase. Alternatively, the opening into the pack may be closed by a separate component such as a lid or a film.

Preferably, however, the blank and pack further comprise an integral lid formed at an upper edge of the front face, back face or side panels so as to be capable of closing the opening. The presence of an integral lid is preferably, as it allows the pack to be supplied as a single piece. Further, having the lid integral allows it to have a precisely defined relationship with the rest of the container by allowing the lid to be reliably located in place.

Edges of the pack in the vicinity of the opening may be featureless, if for example, a lid is simply closed onto the top of the container and fastened in place by a tab, which is engaged when a slot is in the prior, art. Alternatively, a feature such as in turned flanges may surround the opening to assist with the attachment of the lid. However, preferably, the blank or pack further comprising out turned flanges at the upper edges of at least some of the front face, back face and side panels. The flanges may be provided around the edges of all four components if, for example, a separate lid or film is used to close the container. If an integral lid is provided, this is preferably attached to one of the four components, and the flanges are provided the remaining components.

In order to assist with sealing of the lid to the flanges at the opening, preferably at an interface between adjacent flanges there is a cut in the card but not in the underlying film to create a continuous layer of film across and between adjacent flanges.

Further, preferably, at an interface between the lid and an adjacent flange there is a cut in the card but not in the underlying film to create a continuous layer of film across and between the lid and adjacent flange.

Because, the out turned flanges and the lid diverge from one another at the opening, this can form a pin hole to the corner of the container where the flanges meet one another and seal to the lid. A similar effect occurs at the interface of the lid and an adjacent flange. By providing the cut through the cut but not through the film, this provides a continuous layer of film across this interface thereby closing up any potential leakage path at this location. Closing up all of the leakage paths creates a hermetically sealed container. This can allow the atmosphere within the container to be modified if required.

When the side panels are formed of two side panel sections, the flange for the side panel may be provided on one of the two side panel sections such that it extends across the upper side panel section. However, preferably, each side panel section is formed at its upper edge with an out turned flange portion. This provides a more robust manufacturing process and there are no unsupported flange portions. If the out turned flange portions of adjacent side panel sections overlap one another, this provides additional rigidity to the container in the vicinity of the opening.

Preferably, at the interface of a side panel section and its associated flange portion, at the end closest to an adjacent flange portion is a cut out region in the card but not the film. This cut out region in the card removes a layer of card in the vicinity of the junction between the side panel section and its associated flange portion where the two side panel sections meet one another and meet the lid. This cut out portion therefore avoids the step change in the card thickness in this region allowing the film on the flange portions and the lid to form a seal.

The pack is preferably moveable from a fold-flat configuration to the erected configuration without folding the card layer in the side panels. This cannot be done in DE3612032 in which the use of the adhesive tabs means that the joint between the adhesive tabs and the adjacent side panel has to be folded to move between the configurations. Such a container will not sit as flat in the fold flat configuration as this folded card joint tends to bias the side walls open.

The card layer is preferably fully covered with the film layer. In DE3612032 the adhesive tabs are exposed card.

The present invention also extends to a method according to claim 16. As mentioned above, this provides a very efficient manufacturing process as it simply requires three fold lines to be formed in a single plane followed by a single bonding step to form a front face, rear face and side panels without any leakage paths.

BRIEF DESCRIPTION OF THE DRAWINGS

An example of a blank, pack, and method in accordance with the present invention will now be described with reference to the accompanying drawings, in which.

Figure 1:
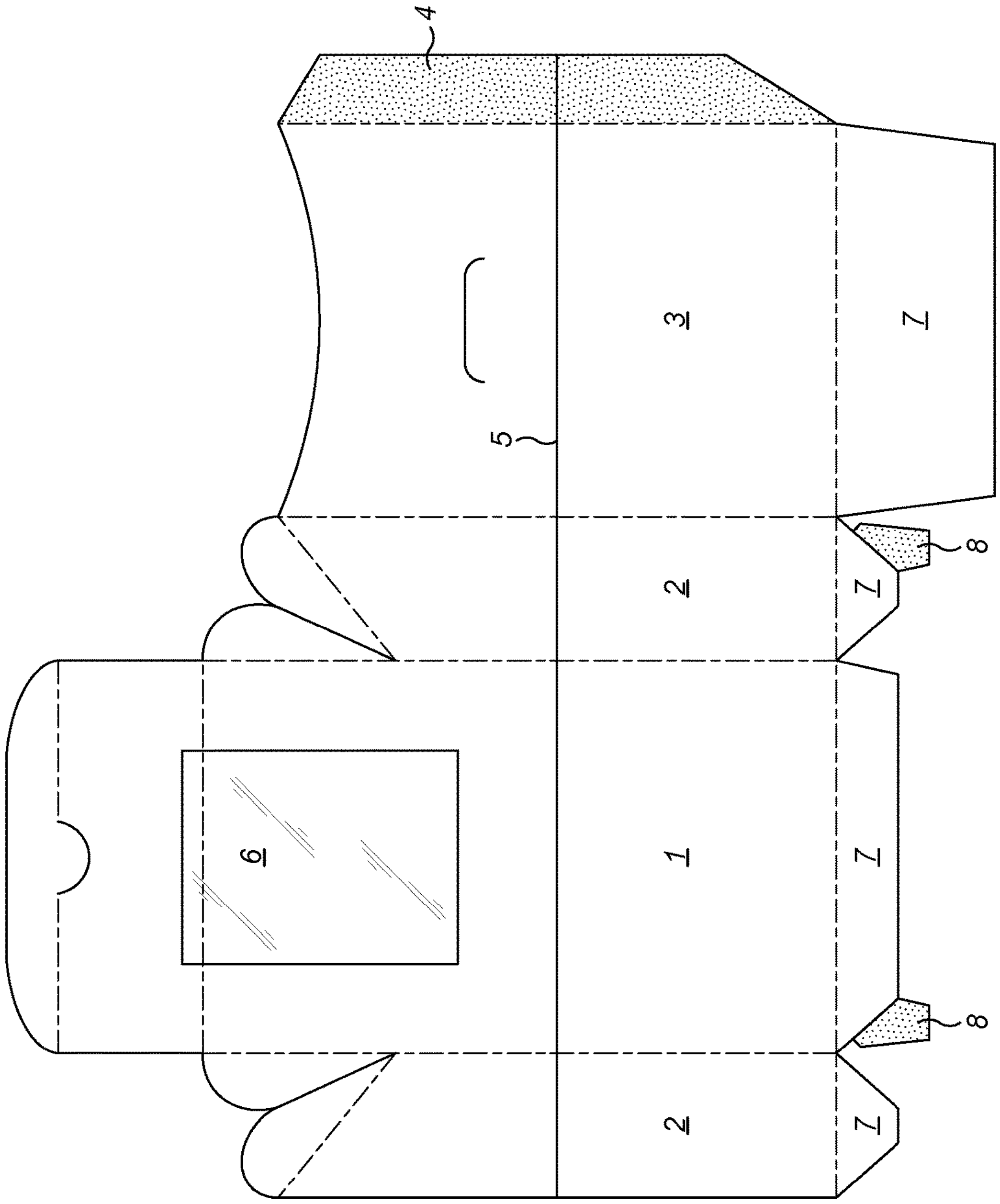
FIG. 1 (Prior Art)
FIG. 1 is a plan view of a blank of the prior art.
Figure 2:
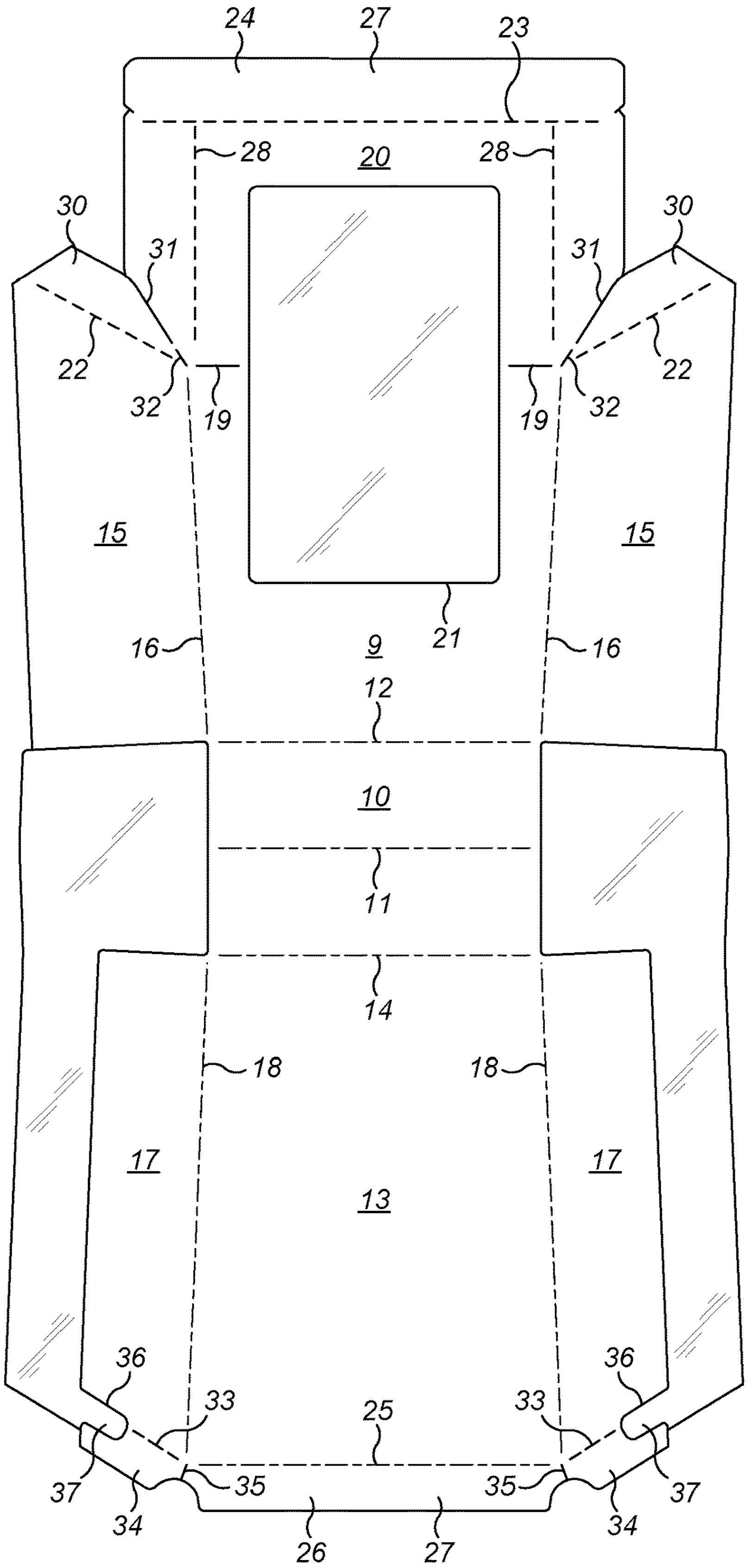
FIG. 2 is a plan view of a blank of the present invention.

The blank shown in FIG. 2 is formed of a laminate of a card layer and film layer. It is depicted in FIG. 2 with the card layer uppermost. The film layer fully covers the card layer and has unsupported film sections as shown as the shaded parts of FIG. 2 as described in greater detail below.

DETAILED DESCRIPTION OF THE PREFERRED EMBODIMENT(S)

As used throughout the specification, the reference to the longitudinal direction is a direction along the blank from top to bottom as shown in FIG. 2. The transverse direction is the direction across the blank from side to side as shown in FIG. 2. Reference to an upper part of the container refers to the upper portion of the container in normal use, namely the end opposite to the base.

In general terms, the container is made up of a number of primary components namely the front face 9 which is connected to a base 10 with a central fold line 11 at its lowermost edge via a first fold line 12. A back face 13 is connected at its lowermost edge to the edge of the base 10 opposite to the front face 9 via a second fold line 14.

At either side of front face 9 are a pair of first side panel sections 15 connected to longitudinal edges of the front face 9 via third fold lines 16. Similarly, on opposite sides of the back face 13 are a pair of second side panel sections 17 connected to the longitudinal edges of the back face 13 along fourth fold lines 18.

As an alternative to having both the first and second side panel sections formed of laminate, these sections could be formed of just film. As a further alternative, only one of the front face 9 and back face 13 may be provided with laminated side panels. In this case, these will need to be longer in the transverse direction as they are required to form the whole of the side of the pack in the erected configuration.

As is apparent from FIG. 2, the height of the back face 13 is greater than the height of the front face 9 which terminates at fifth fold line 19 above which the lid 20 is formed.

A window 21 is formed by cutting the cut but not the film in an area extending across a substantial portion of the front face 9 and lid 20. Other windows may be formed in this region in other regions of the blank in the same way.

The uppermost edges 22 of the first side panel sections 15 are inclined such that the lid extends at an oblique angle along the edges 22 and meets the upper edge of the back face 13 which, as mentioned above, is above the upper edge of the front face 9.

The lid is provided with a transversely extending perforation 23 forming a flange 24. The perforations in the erected configuration are aligned with a corresponding transversely extending perforation 25 on the back face 13 forming an out turned flange 26. When bonded together, the flanges 24, 26 form a tear off tab 27.

Longitudinally extended perforations 28 extending only through card extend away from the tear off tab 27 down either side of the lid towards the fold line 19 and could even extend beyond this. Once the tear off tab 27 has been removed, the lid can be torn along these perforations 28 to open the pack. These perforations are optional and other opening mechanisms could be employed as well known in the art.

At the top of the oblique edges 22 of first panel sections 15 are first flange portions 30, which fold out about the uppermost edge 22. In the blank, there is a single cut 31 through the laminate at the interface between the first flange portion 30 and the lid 10, although there could be a gap here.

At interface between the first flange portion 30 and lid 20 immediately adjacent to the first side panel section 15 there is a small cut 32 designated by the single dashed line in FIG. 2. This extends only through the card and not through the film.

The second side panels sections 17 similarly form uppermost edges 33, which are inclined in alignment with the uppermost edges 22 of the first side panels 15 in the erected configuration.

Second flange portions 34 are provided at the top of each second side panels section 17 and can be folded out about the uppermost edge 33.

At the interface between the second flange panel section 34 and the flange 26 is a small cut 35 similar to the small cut 32 described above that extends only through the card and not through the film thereby separating the flange 26 from an adjacent second flange panel section 34 but leaving a continuous layer of film across the interface.

A cut out 36 is formed in the second side panel section 17 and the adjacent second flange portion 34 spanning the uppermost edge 33. As will apparent from FIG. 2, the cut out 36 is formed in the card only leaving an underlying section of film 37.

The manner in which the blank is formed will now be described with reference to FIGS. 3A-3F.

It should be noted that the blank described above in relation to FIG. 2 does not ever exist in that state as the blank is formed directly in the fold-flat configuration in which (with reference to FIG. 2) it is folded about fold lines 11, 12 and 14 prior to being bonded and cut from the web of material.

The various stages shown in FIGS. 3A to 3F represent a number of consecutive stages as the web of material passes though the processing machine from left to right from FIGS. 3A to 3F.

Figure 3A:
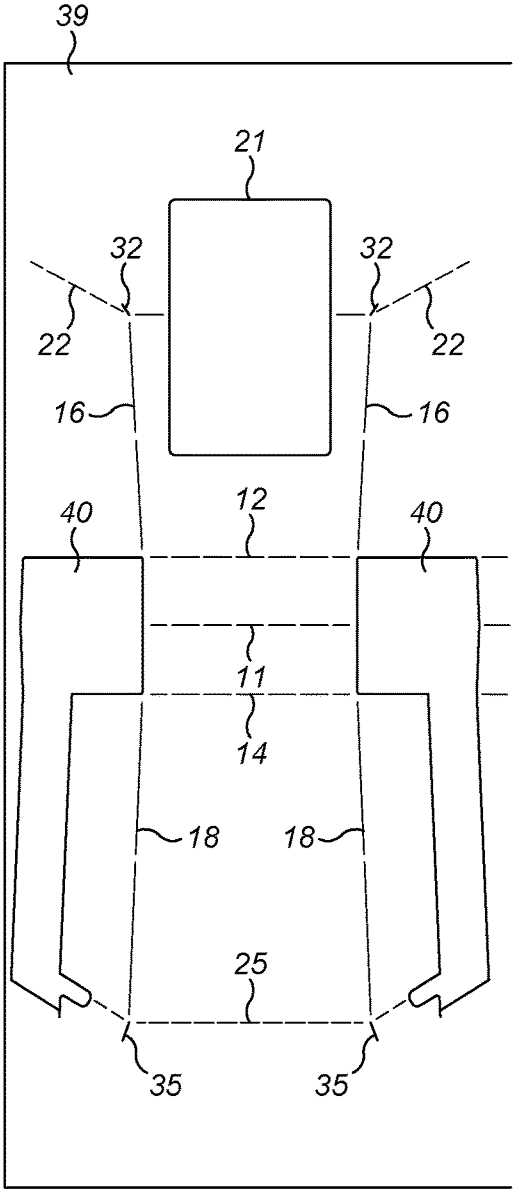
FIGS. 3A-3F show the various stages in the process by which the fold-flat blank is produced on from a flat web of material.

FIG. 3A shows the first stage when a web 39 of material undergoes a first cutting stage. At this point, the web 39 consists only of the card. As shown in FIG. 3A, there are a number of broken lines which represent the various fold lines as previously described. In addition, small cuts 32, 35 as described above are made at this stage.

In addition, three cuts are made fully through the card layer to form three windows. These are a cut out for the window 21 as well as two symmetrical cuts 40 forming windows which correspond to the unsupported film shown as shaded in FIG. 2.

Figure 3B:
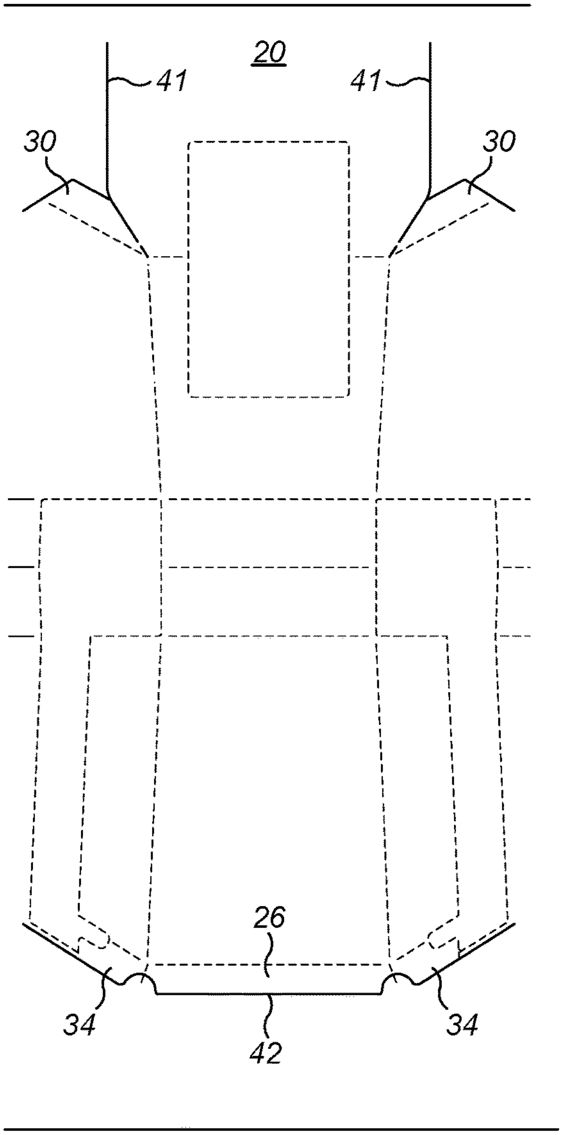

Between the first stage cut in FIG. 3A and the second stage cut shown in FIG. 3B, the web of card is laminated with a layer of plastic film in a well known lamination process. With reference to FIG. 3B, the film layer is on top of the layer of card. In the second cutting stage shown in FIG. 3B, cuts 41 are made through both the card and the film in order to define the outer edges of the lid 20. A cut 42 is made at the lowermost edge of the blank again through the card and film in order to define the second out turned flange 26 and the second flange panel sections 34. This cut 42 intersects with the cuts made for the windows 40 such that part of the blank below the fold line 12 in FIG. 3B has now been separated from the web 39.

Figure 3D:
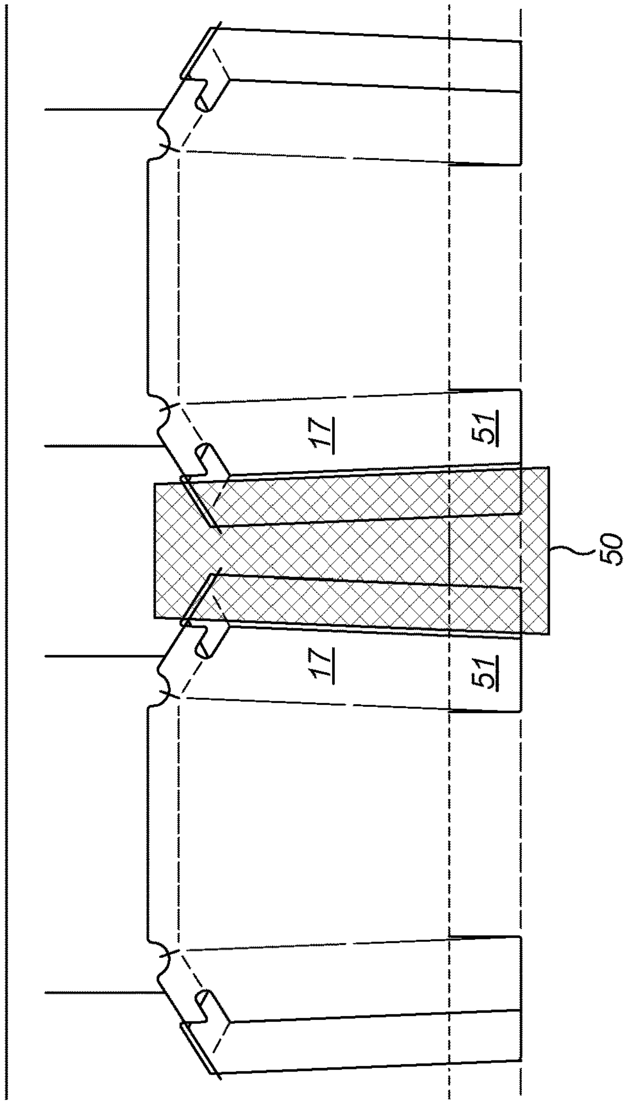
Figure 3C:
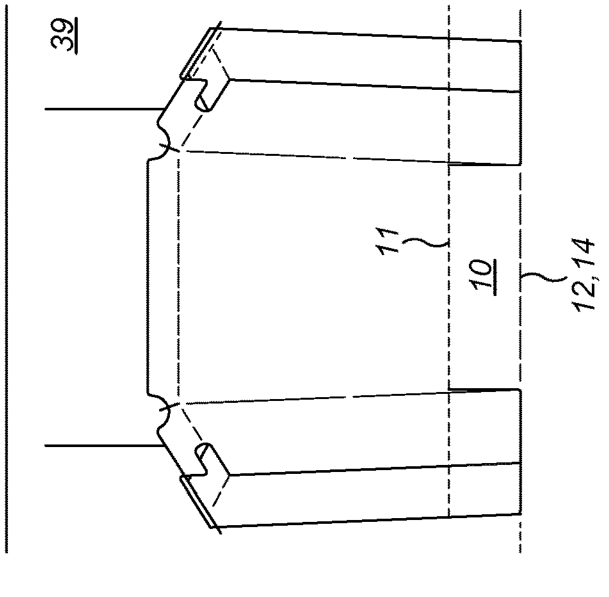

This allows folding to take place as show in FIG. 3C where the base 10 is pushed up at fold line 11 as the lower part of the blank is folded in the opposite sense along fold lines 12, 14 such that the base 10 is effectively tucked up inside the blank which has been folded flat.

In this configuration, heat is applied to region 50 as shown in FIG. 3D which has the effect of bonding the part of the film which is directly beyond the edge of the side panel section 17 onto the underlying side panel section 15. The free film which is between the outer edge of the side panel section 17 and the fourth fold line 18 in the region labelled 51 in FIG. 3D is not heated such that the film here is not bonded by allowing the blank to be moved into the erected configuration as described subsequently.

Figure 3F:
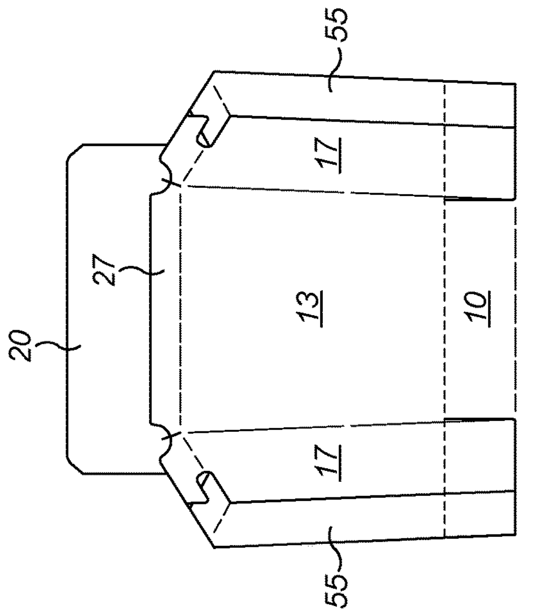
Figure 3E:
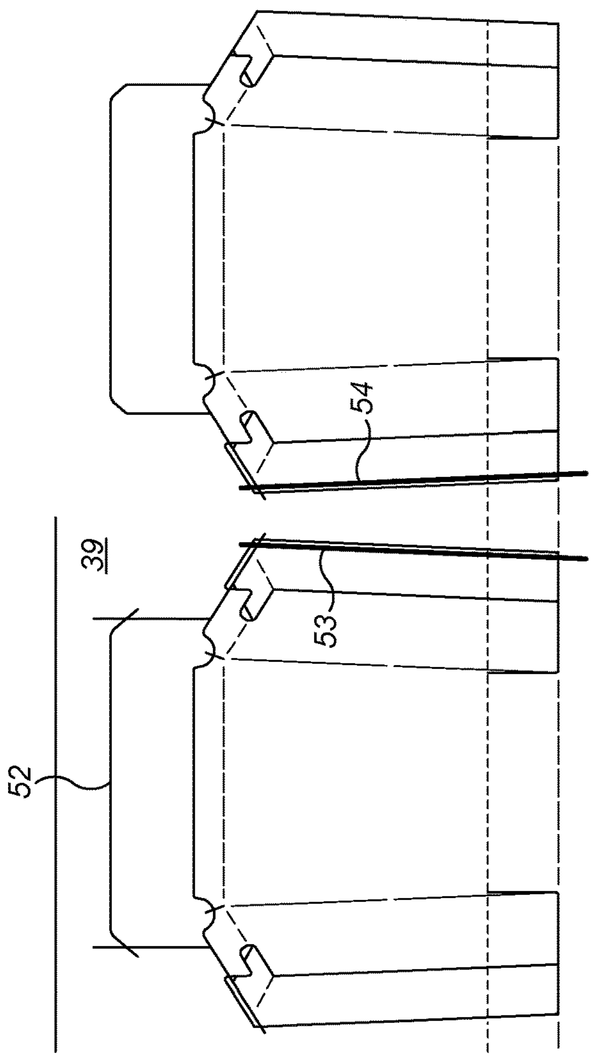

Once bonded, the blank moves to the final cut as shown in FIG. 3E where a cut 52 is made such that the tab 27 is freed from the web 39 and a cut 53 is made to free the right hand edge of the blank from the web 39. In the subsequent position of the right hand side of FIG. 3E, a similar cut 54 is made on the opposite edge of the blank thereby freeing the finished blank from the web 39.

The final blank is show in the fold flat configuration in FIG. 3F this shows the container from the rear with the back face 13 on side panel section 17 being visible while the lid 20 is shown extending above the tear off tab 27.

Outside of the side panel section 17 is a region 55 where the upper layer is the previously described unsupported film and the lower layer is the outermost portion of the side panel section 15.

Figure 4:
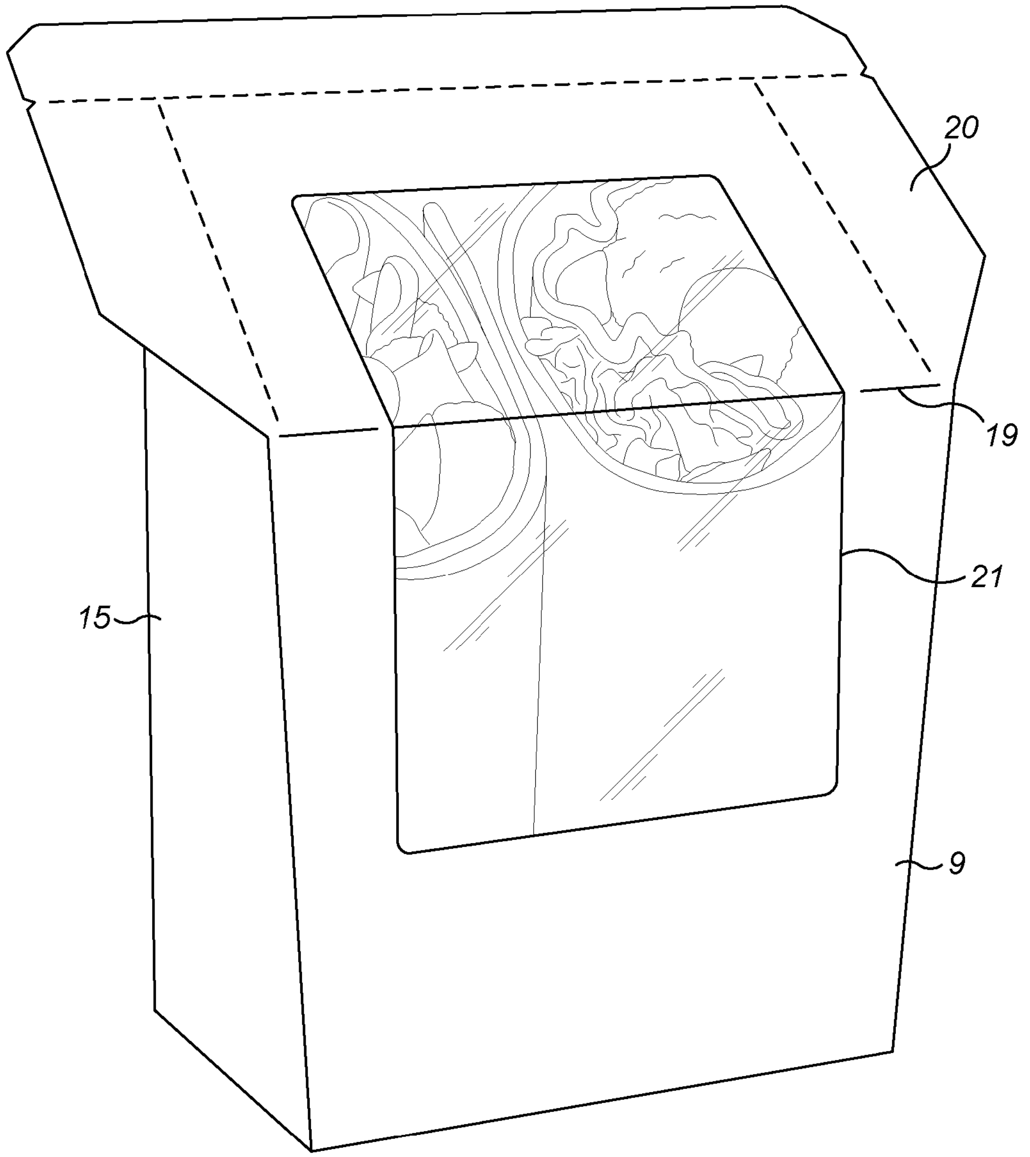
FIG. 4 is a perspective view of an erected container.

In order to create the erected container shown in FIG. 4 from the fold flat blank shown in FIG. 3F, it is essentially a matter of pushing the two sides inwardly. The side panel sections 15, 17 rotate relatively to one another about the outer most edge of the second side panel sections 17 as the container folds about third fold lines 16 and fourth fold lines 18. This causes the base to fold down about the fold lines 11, 12 and 14 until the base is essentially flat and the first side panel section 15 overlies the second side panel section 17.

At the same time, a continuous flange is formed around the upper edge of the container and all sides except for the front face 9 as this has the lid. This upper flange is formed by the flange 26, first flange portions 30 and second flange panels 34. As described above, there is a continuous film running around all of these flanges. Once the erected container is filled, the lid 20 is then folded down onto this flange and sealed in place.

The interior of the container is effectively lined with a single sheet of film where any joints are formed of the surface-to-surface joint between adjacent film sections thereby removing any pin-holes. This allows the creation of a hermitically sealed container. As set above, this can be achieved by a simple manufacturing process to create a fold flat blank which is very easy to erect, fill, and seal.

Particular aspects of the disclosure are described below in the following sets of interrelated Clauses:

Clause 1. A blank which can be folded to form a pack, the blank being formed of a laminate comprising a card layer laminated to a film layer, the blank comprising a laminated front face connected to a laminated base via a first transverse first fold line at one edge of the base, and a laminated rear face connected to the base via a second transverse fold line at the opposite edge of the base, the base having longitudinal edges extending between the one edge and the opposite edge, and a central third transverse fold line about which the base can be folded in the opposite sense to the first and second fold lines;

side panels extending transversely from both sides of the blank from a longitudinal edge of the front face and/or the rear face, such that in the assembled pack in an erected configuration, the upper edges of the front face, back face and side panels form an opening into the pack;

the film layer extending beyond the card layer so as to form an unsupported film regions with a first region extending transversely from the longitudinal sides of the base and a second region continuous with the first region which is positioned to at least partially overlie a corresponding side panel when the blank is folded about the first to third fold lines, the second regions of unsupported film being configured to bond with the film on the corresponding side panel to seal the side panels in the erected pack.

Clause 2. A pack formed from a blank according to Clause 1, wherein, in a fold flat configuration, the base is folded in half about the third fold line, the film in the second unsupported film region is bonded to the film of the corresponding side panel; and in the transversely outermost area of the first unsupported film region, which overlaps with the second unsupported film region, the layers of film are bonded together.

Clause 3. A pack according to Clause 2, wherein the pack formed from the blank is pivotally moveable about the fold lines and a longitudinal axis at the innermost edge of the bonded part of the second unsupported film region of each side panel, such that the pack is moveable from a fold-flat configuration to the erected configuration.

Clause 4. A blank according to Clause 1 or a pack according to Clause 2, wherein each side panel is at least partially formed of the laminate.

Clause 5. A blank or a pack according to Clause 4 wherein at least one of the side panels is formed of two laminated side panels sections, one extending transversely from a lateral edge of the front face and the other extending transversely from a lateral edge of the rear face, one of the panels being narrower than the other in the transverse direction such that the second unsupported film region extends from the longitudinal edge of the narrower panel.

Clause 6. A blank or pack according to Clause 5, wherein the side panel sections of a side panel overlap one another in the erected configuration.

Clause 7. A blank or pack according to any preceding Clause, further comprising an integral lid formed at an upper edge of the front face, back face or side panels so as to be capable of closing the opening.

Clause 8. A blank or pack according to any preceding Clause, further comprising out turned flanges at the upper edges of at least some of the front face, back face and side panels.

Clause 9. A blank or pack according to Clause 8, wherein, at an interface between adjacent flanges, there is a cut in the card but not in the underlying film to create a continuous layer of film across and between the flanges.

Clause 10. A blank or pack according to Clause 8 or Clause 9, wherein at an interface between the lid and an adjacent flange there is a cut in the card but not in the underlying film to create a continuous layer of film across and between the lid and adjacent flange.

Clause 11. A blank or pack according to Clause 5 and any of Clauses 8 to 10, wherein each side panel section is formed at its upper edge with an out turned flange portion.

Clause 12. A blank or pack according to Clause 11, wherein the out turned flange portions of adjacent side panel sections overlap one another.

Clause 13. A blank or pack according to Clause 11 or 12, wherein at the interface of a side panel section and its associated flange portion at the end closest to an adjacent flange portion is a cut out region in the card but not the film.

Clause 14. A blank or pack according to any preceding Clause, configures such that the pack is moveable from a fold-flat configuration to the erected configuration without folding the card layer in the side panels.

Clause 15. A blank or pack according to any preceding Clause, wherein the card layer is fully covered with the film layer.

Clause 16. A method of forming a pack formed from a folded laminate blank according to Clause 1, the method comprising forming the blank;

folding the blank about the first and second fold lines in one sense and about the third fold line in the opposite sense causing the first unsupported film region to fold onto itself and the second unsupported film region to fold onto the film of a corresponding side panel, bonding the second unsupported film region to the film of the corresponding side panel and bonding the film layers at a transversely outermost area of the first unsupported film region which overlaps with the second unsupported film region.

Clause 17. A method according to Clause 16, wherein bonding is a heat sealing process.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A blank having a generally flat state which can be erected to form a pack, the blank being formed of a laminate comprising a card layer laminated to a film layer, the blank comprising a laminated front face connected to a laminated base via a first transverse first fold line at one edge of the base, and a laminated rear face connected to the base via a second transverse fold line at the opposite edge of the base, the base having longitudinal edges extending between the one edge and the opposite edge, and a central third transverse fold line about which the base can be folded in the opposite sense to the first and second fold lines;

side panels extending transversely from both sides of the blank from a longitudinal edge of the front face and/or the rear face, such that in the assembled pack in an erected configuration, upper edges of the front face, back face and side panels form an opening into the pack;

the film layer extending beyond the card layer so as to form unsupported film regions with a first region extending transversely from the longitudinal sides of the base and a second region continuous with the first region which is positioned to at least partially overlie a corresponding side panel when the blank is folded about the first to third fold lines, wherein at least a portion of the second region of unsupported film is heat sealed with at least a portion of the film on the corresponding side panel to form a heat-sealed bond that seals the side panels in the erected pack, the heat-sealed bond being present in the blank in its generally flat state.

2. A pack formed from a blank according to claim 1, wherein, in a fold flat configuration, the base is folded in half about the third fold line, the film in the second unsupported film region is bonded to the film of the corresponding side panel; and in the transversely outermost area of the first unsupported film region, which overlaps with the second unsupported film region, the layers of film are bonded together.

3. A pack according to claim 2, wherein the pack formed from the blank is pivotally moveable about the fold lines and a longitudinal axis at the innermost edge of the bonded part of the second unsupported film region of each side panel, such that the pack is moveable from a fold-flat configuration to the erected configuration.

4. A blank according to claim 1, wherein each side panel is at least partially formed of the laminate.

5. A blank according to claim 4, wherein at least one of the side panels is formed of two laminated side panels sections, one extending transversely from a lateral edge of the front face and the other extending transversely from a lateral edge of the rear face, one of the panels being narrower than the other in the transverse direction such that the second unsupported film region extends from the longitudinal edge of the narrower panel.

6. A blank according to claim 5, wherein the side panel sections of a side panel overlap one another in the erected configuration.

7. A blank according to claim 5, wherein each side panel section is formed at its upper edge with an out turned flange portion.

8. A blank according to claim 7, wherein the out turned flange portions of adjacent side panel sections overlap one another.

9. A blank according to claim 7, wherein at the interface of a side panel section and its associated flange portion at the end closest to an adjacent flange portion is a cut out region in the card but not the film.

10. A blank according to claim 1, further comprising an integral lid formed at an upper edge of the front face, back face, or side panels so as to be capable of closing the opening.

11. A blank according to claim 10, further comprising out turned flanges at the upper edges of at least some of the front face, back face, and side panels.

12. A blank according to claim 11, wherein, at an interface between adjacent flanges, there is a cut in the card but not in the underlying film to create a continuous layer of film across and between the flanges.

13. A blank according to claim 11, wherein at an interface between the lid and an adjacent flange there is a cut in the card but not in the underlying film to create a continuous layer of film across and between the lid and adjacent flange.

14. A blank according to claim 1, configured such that the pack is moveable from a fold-flat configuration to the erected configuration without folding the card layer in the side panels.

15. A blank according to claim 1, wherein the card layer is fully covered with the film layer.

16. A method of forming a pack formed from a folded laminate blank according to claim 1, the method comprising:

forming the blank;

forming a folded blank having a generally flat state by folding the blank about the first and second fold lines in one sense and about the third fold line in the opposite sense causing the first unsupported film region to fold onto itself and the second unsupported film region to fold onto the film of a corresponding side panel; and when the blank is in the generally flat state, heat sealing the second unsupported film region to the film of the corresponding side panel and bonding the film layers at a transversely outermost area of the first unsupported film region which overlaps with the second unsupported film region.

17. A blank according to claim 1, wherein the upper edge of the front face is parallel to the first transverse fold line and the upper edge of the rear face is parallel to the second transverse fold line, and further wherein the upper edges of the side panels are inclined with respect to the upper edge of the front face and/or the upper edge of the rear face.

18. A blank according to claim 1, wherein the upper edge of the front face is parallel to the first transverse fold line and the upper edge of the rear face is parallel to the second transverse fold line, and further wherein the upper edges of the side panels are parallel to the upper edge of the front face and/or the upper edge of the rear face.

* * * * *